US009066509B2

(12) United States Patent
Victorio da Costa

(10) Patent No.: US 9,066,509 B2
(45) Date of Patent: Jun. 30, 2015

(54) MOTORISED FUMIGATION SYSTEM

(75) Inventor: Marcius Adolpho Victorio da Costa, Rio de Janeiro (BR)

(73) Assignee: FUMAJET COMERCIO DE EQUIPAMENTOS LTDA., Rio de Janeiro (BR)

( * ) Notice: Subject to any disclaimer, the term of this patent is extended or adjusted under 35 U.S.C. 154(b) by 62 days.

(21) Appl. No.: 13/805,242

(22) PCT Filed: May 27, 2011

(86) PCT No.: PCT/BR2011/000158
§ 371 (c)(1),
(2), (4) Date: Dec. 18, 2012

(87) PCT Pub. No.: WO2012/009771
PCT Pub. Date: Jan. 26, 2012

(65) Prior Publication Data
US 2013/0091757 A1    Apr. 18, 2013

(30) Foreign Application Priority Data

Jul. 22, 2010    (BR) ................................ 1003535

(51) Int. Cl.
*A01M 13/00*    (2006.01)
*A01M 7/00*    (2006.01)
(Continued)

(52) U.S. Cl.
CPC .................................. *A01M 13/00* (2013.01)

(58) Field of Classification Search
CPC ..... A01M 13/00; A01M 1/20; A01M 1/2022; A01M 1/2027; A01M 1/2038; A01M 1/2061; A01M 7/0003; A01M 7/0014; A01M 7/0042; B05B 7/0012; B05B 7/16; B05B 7/1613; B05B 7/1693; B05B 7/20
USPC ........... 239/69, 124, 126–131, 135, 136, 172, 239/289, 302, 329; 43/1, 124, 125, 129, 43/900
See application file for complete search history.

(56) References Cited

U.S. PATENT DOCUMENTS 2,685,146 A * 8/1954 Stevens ........................... 43/129
2,745,210 A * 5/1956 Hild ................................ 43/125
(Continued)

FOREIGN PATENT DOCUMENTS

BR    7201579    3/1994
BR    7901372 U    2/2001
(Continued)

OTHER PUBLICATIONS

International Search Report for International Appl. No. PCT/BR2011/000158, Aug. 5, 2011.

*Primary Examiner* — Darren W Gorman
(74) *Attorney, Agent, or Firm* — Nevrivy Patent Law Group P.L.L.C.

(57) ABSTRACT

The present invention relates to a motorized fumigation system designed to promote the control of agricultural and urban pests in open spaces, more particularly among the systems that can carry out the fumigation process by creating a hot or a cold mist, and more specifically due the fact of both processes of the mist creation could be integrated into one light weight vehicle. The system of the present invention consists of three subsystems: a first subsystem designed to storage and pumping (S1); a second subsystem designed to hot fumigation (S2); and a third subsystem designed to cold fumigation (S3).

16 Claims, 5 Drawing Sheets

(51) Int. Cl.
  *B05B 1/24*   (2006.01)
  *B05B 7/16*   (2006.01)
  *B05B 7/24*   (2006.01)

(56) References Cited

U.S. PATENT DOCUMENTS

| | | | | |
|---|---|---|---|---|
| 2,886,249 A | * | 5/1959 | Sidlow | 239/77 |
| 3,239,960 A | * | 3/1966 | Stevens | 43/129 |
| 3,646,701 A | * | 3/1972 | Pfaffenbach | 43/129 |
| 3,648,401 A | * | 3/1972 | Stains | 43/129 |
| 3,917,168 A | * | 11/1975 | Tenney | 239/13 |
| 4,298,167 A | | 11/1981 | Stahl et al. | |
| 4,512,515 A | * | 4/1985 | Tenney | 239/129 |
| 4,992,206 A | * | 2/1991 | Waldrop | 516/6 |
| 5,154,018 A | * | 10/1992 | Livingston | 43/125 |
| 6,032,407 A | * | 3/2000 | Conner | 43/129 |
| 6,669,105 B2 | | 12/2003 | Bryan et al. | |
| 2004/0217199 A1 | | 11/2004 | Bryan et al. | |
| 2006/0016907 A1 | * | 1/2006 | Miles | 239/172 |

FOREIGN PATENT DOCUMENTS

| | | |
|---|---|---|
| BR | 0301649 A | 9/2004 |
| FR | 2730042 A1 | 8/1996 |

* cited by examiner

MOTORISED FUMIGATION SYSTEM

FIELD OF THE INVENTION

The present invention is related to motorised systems to promote a fumigation in order to control pests in agricultural and urban open spaces environment, more particularly among the systems that can carry out the fumigation process by creating a hot mist and cold mist, and more specifically among the systems which employ light weight vehicles provided of easy displacement of any type of terrain.

BACKGROUND OF THE INVENTION

Pests, whether urban or agricultural, has ever been the subject of concern and the act of controlling and extinguishing these pests has always been exercised by man.

Over time, various techniques have been used for dispensing pesticides.

Typically the pesticides are presented in a fluid or finely divided powder forms. This document is focused on pesticides in a fluid form.

In the prior art technique, it can be found several documents that disclose methods and equipment for dispensing these fluid products in the form of mist. A first group usually uses a pumping system with high pressure which may have features pulsing or vibrating, which leads the fluid to dispersion devices in order to reduce it to very small particles which are then carried by the air jet generated by one of the following devices: a large-capacity blower or air coming from a compressor and tank assembly.

These particles of fluid pesticide must have a very small size in order to be light enough to remain suspended in the air for some time. However, the existing equipment are usually large and heavy, which are only possible to be carried by trucks or vans of medium size, which still must travel in low speed. The applying of this technique, however, has as a negative side effect regarding the formation of a residual layer of fluid pesticides in the environment, which may cause damages to man caused by the possible contact therewith.

This problem was attempted to be solved by installing additional sensors and circuitry to analyze the size of the droplets emitted by the device, sophisticating somewhat the equipment, but on the other hand, complicating further the system and adding more items likely to maintenance.

Another limitation is the fact that the trucks or vans adapted for this purpose do not can travel on rough terrain. There are attempts to use lighter vehicles with four wheels, but even so, the items relating to safety and quick maneuverability remain as a source which prevents such attempts in any scenario more complicated.

Another technique used to dispense fluid pesticide is known as thermo-nebulization.

Typically this kind of technique involves heating a fluid until vaporize it and further carrying this hot steam to the application area.

The state of art technique already know many systems to perform thermal fogging, which are from devices that can be conducted by an operator, to devices coupled to the trucks, SUVs, planes, tractors and other vehicles specially adapted for this purpose.

Observing the operation of the thermo-nebulizers, it is worth quoting as the more common those who are engaged in the vehicles bucket. These thermo-nebulizers devices, which usually work with an autonomous motorization, are usually heavy and made up of several stages of components.

Moreover, the vehicles that carry them have limitations on their autonomy characteristics for use due to own ground wherever they go, avoiding usually the use of rudimentary trails or rough places. There is also the possibility that the bumps on the way can displace the thermo-nebulizer, damaging it to the point of causing serious accidents once it is working with potentially flammable hot products. Moreover, the possibility of occurring displacements of these equipments in terms of generating cold mist also exists.

However, vehicles equipped with this kind of equipment who works in hot conditions, had discontinued its use mainly in urban areas. A first reason was due to the mist formed, which by being very dense and high dispersion time, diminishing visibility of other vehicles that need to travel on the street that was being fumigated. A second reason was due by the very people which by feeling uncomfortable with the smoke, had to shut the windows of their homes in order to prevent this smoke to come into their homes.

In a simple analysis, the hot system would be more adapted to environments not inhabited, such as crops; however, the fact of this crop to be in a rugged terrain, where a utility vehicle could not move so well across it, still represents an insurmountable barrier.

Trying to overcome the limitation described just above, proposals have emerged aiming to simplify operation and increase the ability to reach some places hitherto inaccessible.

The thermo-nebulizer became a portable device, commonly known as costal thermo-nebulizer.

Basically the operational principle was maintained using a engine, a reservoir, a spark system where the insecticide burn, an exhaust pipe and a manual transmission fluid system to be manipulated by an operator.

The main problems arising from this kind of proposal resides on the weight of the equipment, which is still very high, which causes operator fatigue, and the need for an operator with a certain skill when handling the equipment. An undue functioning of the equipment caused by the lacking skill of the operator, could transform this kind of equipment on a flamethrower.

RELATED ART

There are several documents in the art that show possible embodiments of fumigation equipment to operate in open spaces.

Document U.S. Pat. No. 3,648,401 (George S. Stains), here mentioned by reference, describes a method for producing a device for creating a mist to kill insects, with the production of droplets with size ranging from 5 to 15 microns. The mist comprises a pesticide mixed with a second non-volatile fluid vehicle in a ratio of 4 to 1 by volume. The equipment includes a blower driven by an engine, and provides 12.74 cubic meters of air per minute at a pressure about 27.58 kilopascal. This air is directed to a group of 4 vertical injecting nozzles of the air-fluid type, which atomize the insecticide and release it into the atmosphere.

Document U.S. Pat. No. 3,917,168 (William L. Tenney), here mentioned by reference, discloses an aerosol generating equipment usable for dispensing fluid material in the form of relatively small droplets into the atmosphere. The aerosol generating equipment has a pump which operates to supply hot air to a dispensing nozzle. The fluid material under pressure is also supplied to the dispensing nozzle. A flow regulator controls the fluid material flow rate, and a flow meter, combined with a fluid material temperature sensor, is used for monitoring the fluid flow rate. The hot air at the nozzles heats the fluid material within the nozzle, in order to make a decrease in viscosity of the fluid material and facilitate its atomization.

Document U.S. Pat. No. 4,992,206 (J. David Waldron), here inserted by reference, describes an aerosol mist generating equipment having a first engine and a blower for dispensing air through a ducts system, directing to a nozzle. The fluid introduction system is designed for introducing fluid in this nozzle and dispersing this fluid in the form of a mist into the atmosphere. The device is an aerosol generator capable of dispensing small amounts of the concentrated active agent, over a large area.

Document U.S. Pat. No. 6,669,105 (Bryan L. Avron and Larry D. Helder), here mentioned by reference describes a mobile system which functions under real time regime and in a closed circuit, and a method for applying an insecticide in the form of an aerosol to a treatment area, for a given time.

The system employs an engine and a spray nozzle through which an air volume is produced so as to drag an insecticide in the form of particles. A particle size detector and a controller are used to regulate the amount of insecticide in function of the detected particle size, engine speed, and the weather conditions at the treatment area by means of the information provided by a GPS system.

The document MU 7201579 9U2 (Peter Schuller), here mentioned by reference, describes an equipment designed for insecticide spray, in which a dried spray of this insecticide occurs, theoretically causing no formation of residues. Such a nebulization is obtainable by the injection of the insecticide solution coming from a manually pressurized vessel, inside a coil which surrounds a combustion engine silencer, and injecting the heated mixture into the said silencer.

Document U.S. Pat. No. 4,298,167 (Karl-Heinz Stahl and others), here mentioned by reference, describe an mist generator apparatus driven by an operator for applying pesticides to plants that includes at least two outputs for which the generated mist is emitted to the environment. The mist is generated by a combustion chamber and supplied by a duct to the outputs, which distributes it in opposite directions.

Document U.S. Pat. No. 4,512,515 (William L. Tenney), here mentioned by reference, describes an apparatus for producing mist by thermo-nebulization, said apparatus having an internal combustion engine which drives a blower to discharge to the atmosphere a continuous air flow through the interior of an exhaust tube. The hot gases exhausted from the engine are directed to an inner silencer and to a rear tube in the air stream within the exhaust pipe. A fluid formulation stored in a reservoir is dispensed within the silencer. The hot gas from the silencer atomizes and vaporizes the fluid formulation, which is carried out of the machine. A manual control is used to regulate the supply of gas under pressure, which is directed to the interior of the reservoir. The control includes a valve that is operable to relieve the gas pressure derived from the blower to into the container and to stop, if necessary, the fluid formulation supply.

Technically speaking, there is a need for an alternative option to fumigation of open spaces, that is versatile for the possibility of generating cool or warm mist according to the application environment, and that can transiting in any kind of terrain.

SUMMARY OF THE INVENTION

The present invention is a powered fumigation system designed to promote pest control in agricultural and urban open spaces, more particularly, the present invention is related to a system which can perform the fumigation by means a process, which can create either a hot mist or a cold mist. Both processes to create mist are integrated into a light weight vehicle, which is easy for moving across any kind of terrain; such as a motorcycle.

It is an object of the present invention to purpose a powered fumigation system designed to promote the control of agricultural and urban pests in open spaces, more particularly among the systems that can carry out the fumigation process by creating a hot or a cold mist, and more specifically due the fact of both processes of the mist creation could be integrated into one light weight vehicle.

The system of the present invention consists of three subsystems: a first subsystem designed to storage and pumping; a second subsystem designed to hot fumigation; and a third subsystem designed to cold fumigation.

The system of the present invention has the following advantages: simplicity of operation—by having components micro-controlled, the system does not require a skilled operator, allowing the operator be concentrate only on the route he will need transit in order to fumigate the area being subjected to treatment; the ability to work both in inhabited open areas, where the predominance of the fumigation is made with cool mist, as well as in open areas where the hot or thermo-nebulized mist appear more efficient; and, the whole equipment assembly in a motorcycle, makes the equipment more operational for any kind of ambient or terrain, with excellent maneuverability and speed of operation.

The term "guidance device" of a vehicle, means a steering wheel of a vehicle, handlebars of a motorcycle or the like, or any type of directional device used in any kind of vehicles.

BRIEF DESCRIPTION OF THE FIGURES

The characteristics of the said powered fumigation system, object of the present invention, will be better viewed from the detailed description hereinafter, which is only for a way of example, associated to the drawings referenced below, which are an integral part of this report.

DETAILED DESCRIPTION OF THE INVENTION

The detailed description of the powered fumigation system, object of the present invention will be made in accordance with the identification of components that form the basis of the Figures described above.

It is an object of the present invention, a powered fumigation system, designed to promote the fumigation designated to pest control in agricultural and urban open spaces. More particularly, the invention lies among systems that can perform the fumigation by means a process of producing a hot mist or a cold mist. More specifically, both processes of producing kinds of mist are integrated into a light weight vehicle, which is easy to moving on any kind of terrain, such as a motorcycle.

Figure 1:
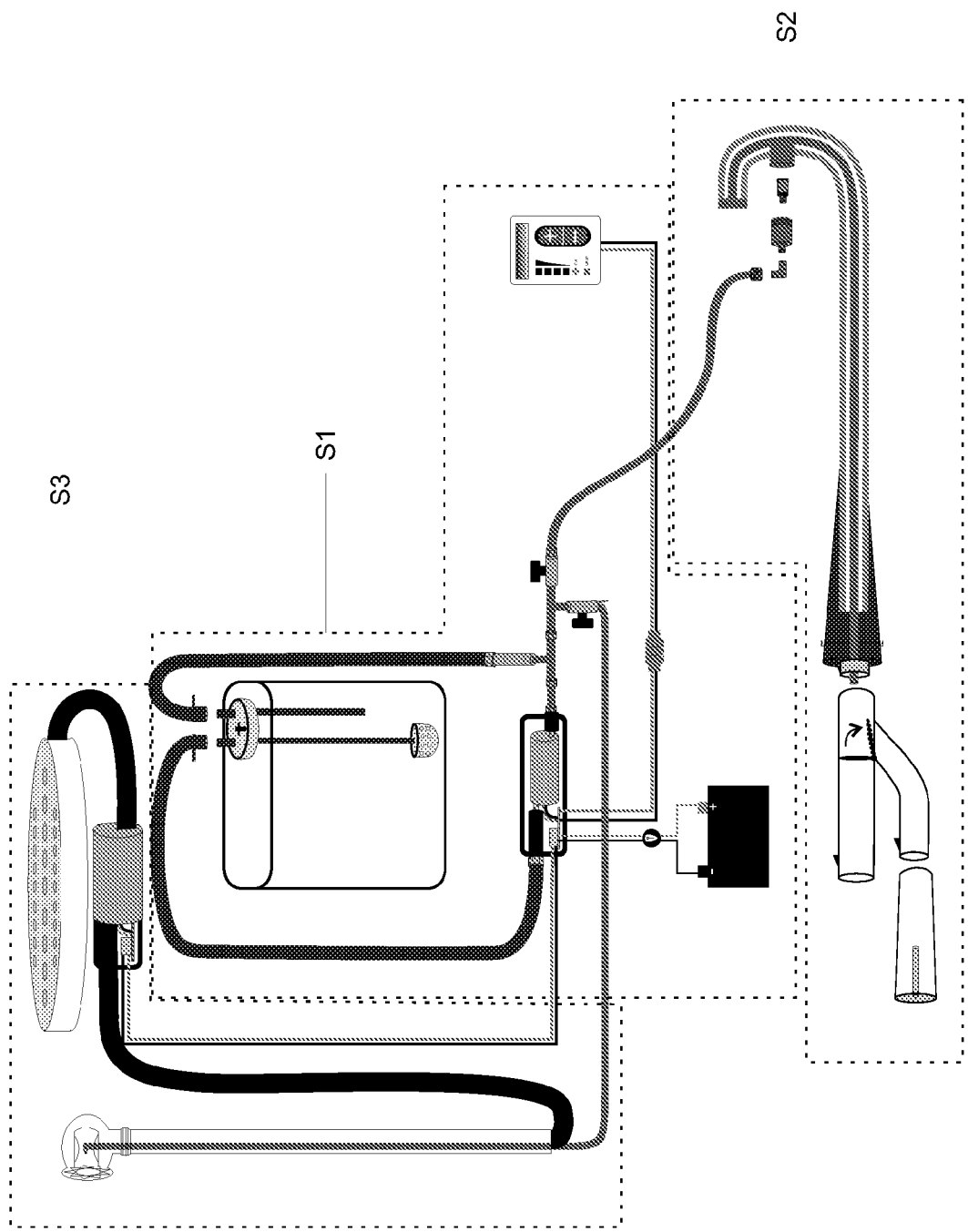
FIG. 1 is a representation of the embodiment of the powered fumigation system, according to the present invention, in which the three subsystems that comprise it are marked by dashed areas.

The system of the present invention consists of three subsystems: a first subsystem of storage and pumping (S1), a second subsystem of hot fumigation (S2) and a third subsystem of cold fumigation (S3). The identification of these subsystems may be by means of the hatching areas shown in FIG. 1.

Figure 2:
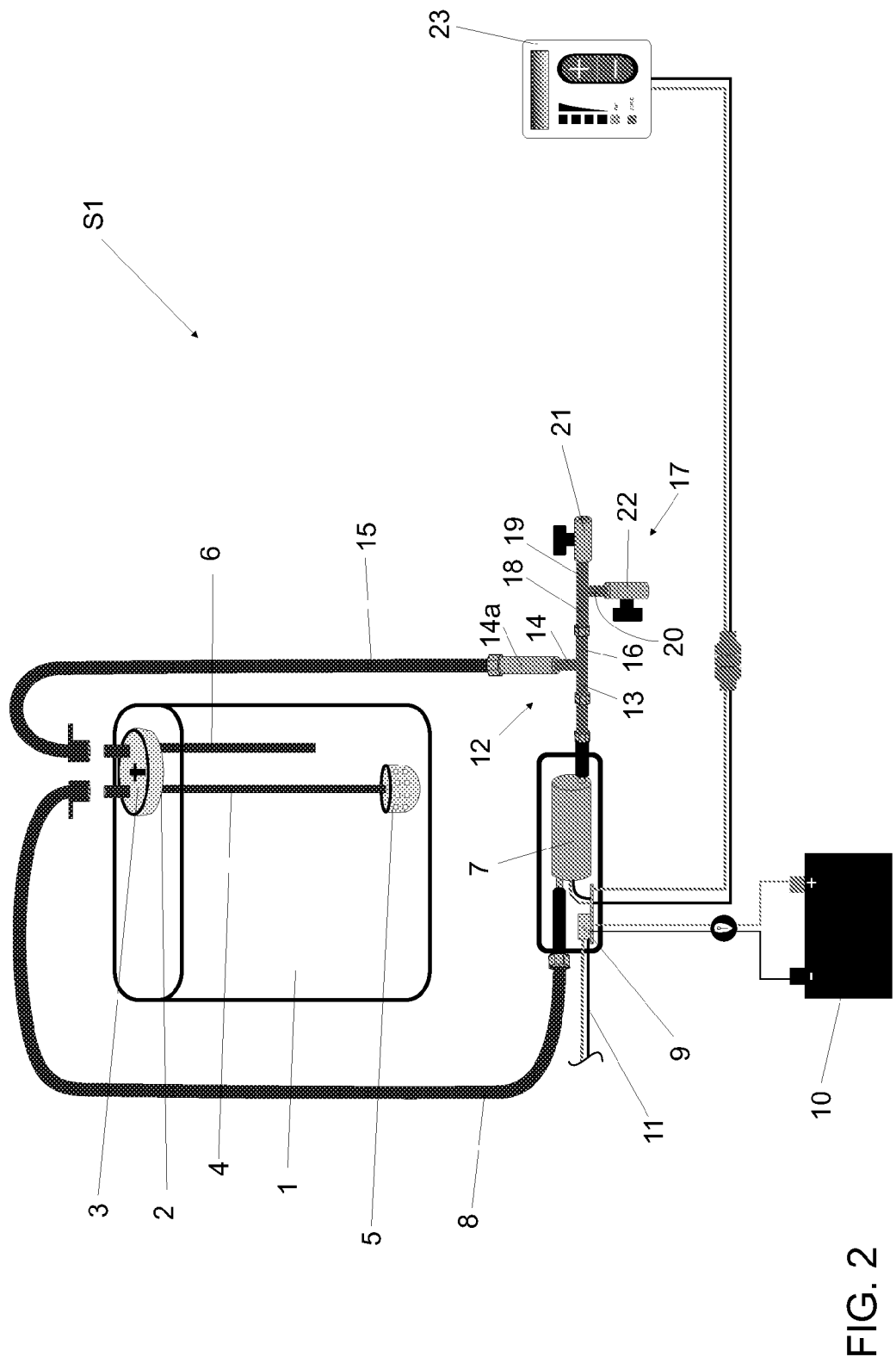
FIG. 2 is a representation of a first subsystem of storage and pumping, according to the present invention.

The first subsystem of storage and pumping (S1) can be seen in detail in FIG. 2 and it can be seen that it comprises:

a reservoir (1), of capacity and configuration compatible to be fixed on the rear part of a light weight vehicle (V) (not shown in Figure), with a top opening (2) for introducing fluid to be fumigated and a lid (3) to be fitted to the upper opening (2), which has two ducts being structurally integrated: a first fluid suction duct (4) which serves to carry the fluid to outside the reservoir (1), which has a filtering element (5) at its inner end to the reservoir (1) and a second fluid return duct (6) which serves to return the excess fluid to the reservoir (1) when the maximum flow rate and pressure exceeds a predetermined limit;

a centrifugal pump (7), which serves to pump fluid from the first fluid suction duct (4) which is connected to the inlet of this centrifugal pump (7) by means of a first flexible hose (8);

a microprocessor based electronic module (9), preprogrammed and electrically connected to the battery (10) of the light weight vehicle, and electrically connected to the electric power of the centrifugal pump (7), which serves to regulate the amount of electric current that is sent to the centrifugal pump (7) and increase or decrease the speed of said centrifugal pump (7) and thus increase or decrease the fluid flow pressure at the outlet of said centrifugal pump (7); said microprocessor based electronic module (9) additionally showing an interface (11) for connection to another control system;

a first tube "T" (12) having an inlet extension (13) connected to the outlet of the centrifugal pump (7), has an recycle extension (14) interconnected by means of a pressure valve (14a), of type "always closed", to the second return duct (6), by means of a second hose (15), and has an outlet extension (16) to carry the fluid to be fumigated;

a second tubing "T" (17) has an inlet extension (18) connected to the outlet extension (16) of the first tube "T" (12) has a first distribution extension (19) for sending fluid to a hot fumigation subsystem, and has a second distribution extension (20) for sending fluid to a cold fumigation subsystem;

a first control valve (21) which serves either to release or to shut off the fluid flow into the hot fumigation subsystem and that is connected to the first distribution extension (19);

a second control valve (22) which serves to release or shut off the fluid flow to the cold fumigation subsystem is connected to the second distribution extension (20);

a switching box (23), attached to the guidance device of the light weight vehicle (V), is electrically connected to the microprocessor based electronic module (9) and serves to start, disconnect and determine the functioning rate of the whole system.

Figure 3:
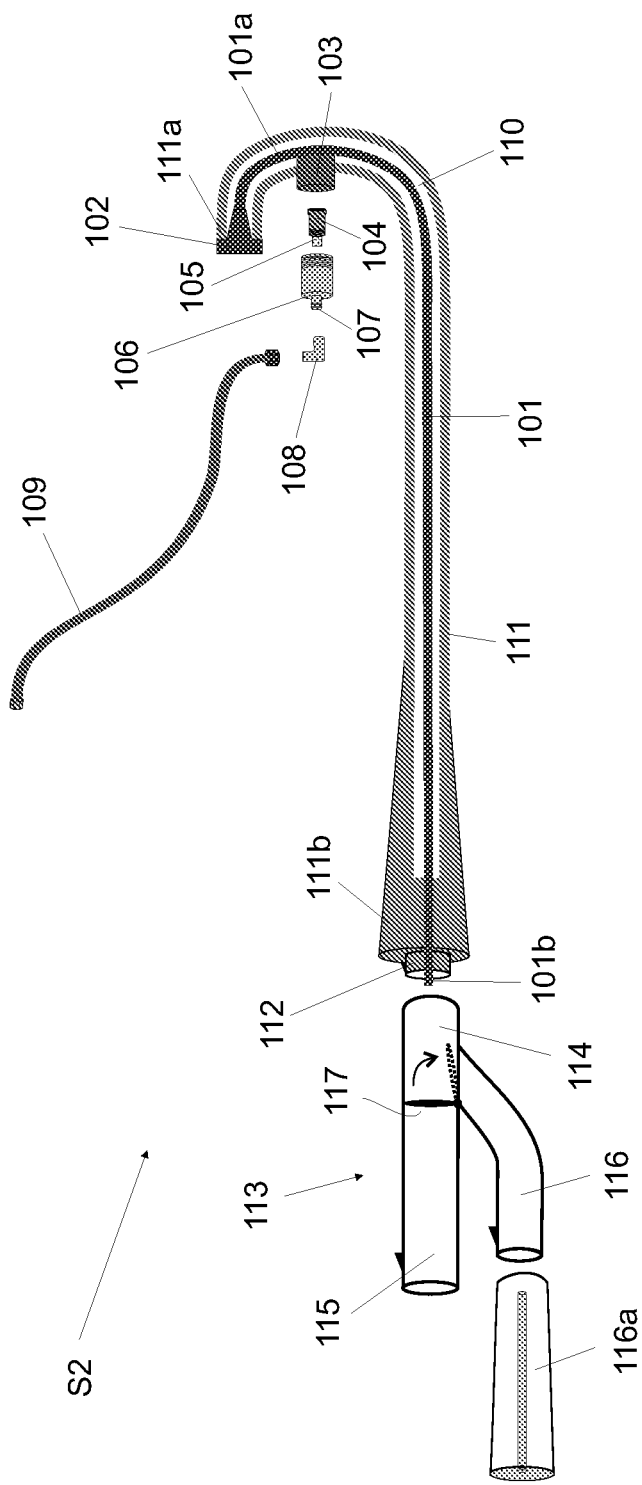
FIG. 3 is a representation view in transparency and exploded view of a second subsystem for hot fumigation, according to the present invention.

The second hot fumigation subsystem (S2) designed to promote the mist generation by heat action, is connected to the output collector of the exhaust gases coming from of a combustion engine (M), can be seen with the aid of FIG. 3 and comprises the following components:

an inner tube (101), made with a high thermal conductivity material, initially with a curved region provided with a tapered sleeve (102), fixedly attached to the end of the curved region (101a) for collect and carry the hot gases coming from the output collector of the engine (M), and later continued straight to the end of its extension, and a terminal end (101b) at the end of the continuing straight, adjacent the outlet region of the hot gases coming from the engine (M);

a combustion capsule (103), is fixedly attached to the inner tube (101) on the curved region (101a) in open communication with the interior of this inner tube (101), which serves to inject fluid that is burned by the hot gases coming from the combustion inside the engine (M);

a injection spray nozzle (104), embedded within the combustion capsule (103), which serves to disrupt the fluid into tiny particles, has at the fluid inlet end a filter (105), designed to prevent clogging thereof;

a wrap closure (106), which serves to receive, contain and to force the fluid passage through the injection spray nozzle (104), presents a threaded end to be screwed into the capsule combustion (103), and a fluid inlet end (107) with diameter smaller than that of the threaded end;

a connection type "L" (108) connected to the fluid inlet end (107) of the wrap closure (106) is interconnected with the first control valve (21) through a third hose (109) which carry the fluid to be thermo-nebulized;

a thermal blanket (110) of high thermal insulation capacity, involves the entire inner tube extension (101), including a combustion capsule (103), and serves to prevent the heat losses of the hot gases coming from the output collector of the combustion engine (M);

an outer body (111) having the same configuration as the inner tube (101) surrounds the latter and the thermal blanket (110) like a shell and has a first end (111a) designed to be fixed and to promote the union between the end of the curved region (101a) and the conical sleeve (102), to the output collector of the engine (M), with a second end (111b) configured into form of a straight cross section with slightly conical profile, where, by the center part, it exceeds a length of the inner tube (101), and concentrically to the latter, a hollow cylinder (112);

a flow guidance element (113) designed for expulse the hot gases coming from the engine (M) according to the functions of common exhaust and nebulization, shows a tube configuration with two ends, the first being one gas receiving end (114), to be attached to the hollow cylinder (112) of the outer body (111), with one first exhaust end (115) of fumigation, and one second exhaust end (116) provided with a silencer (116a); internally to this flow guidance element (113) there is a bulkhead (117), whose positioning is controlled by an external manipulator (118) (not shown), bulkhead (117) which serves to direct the hot mist flow directly to the first exhaust end (115) and to guide the gas flow from the engine (M) to the second exhaust end (116).

Figure 4:
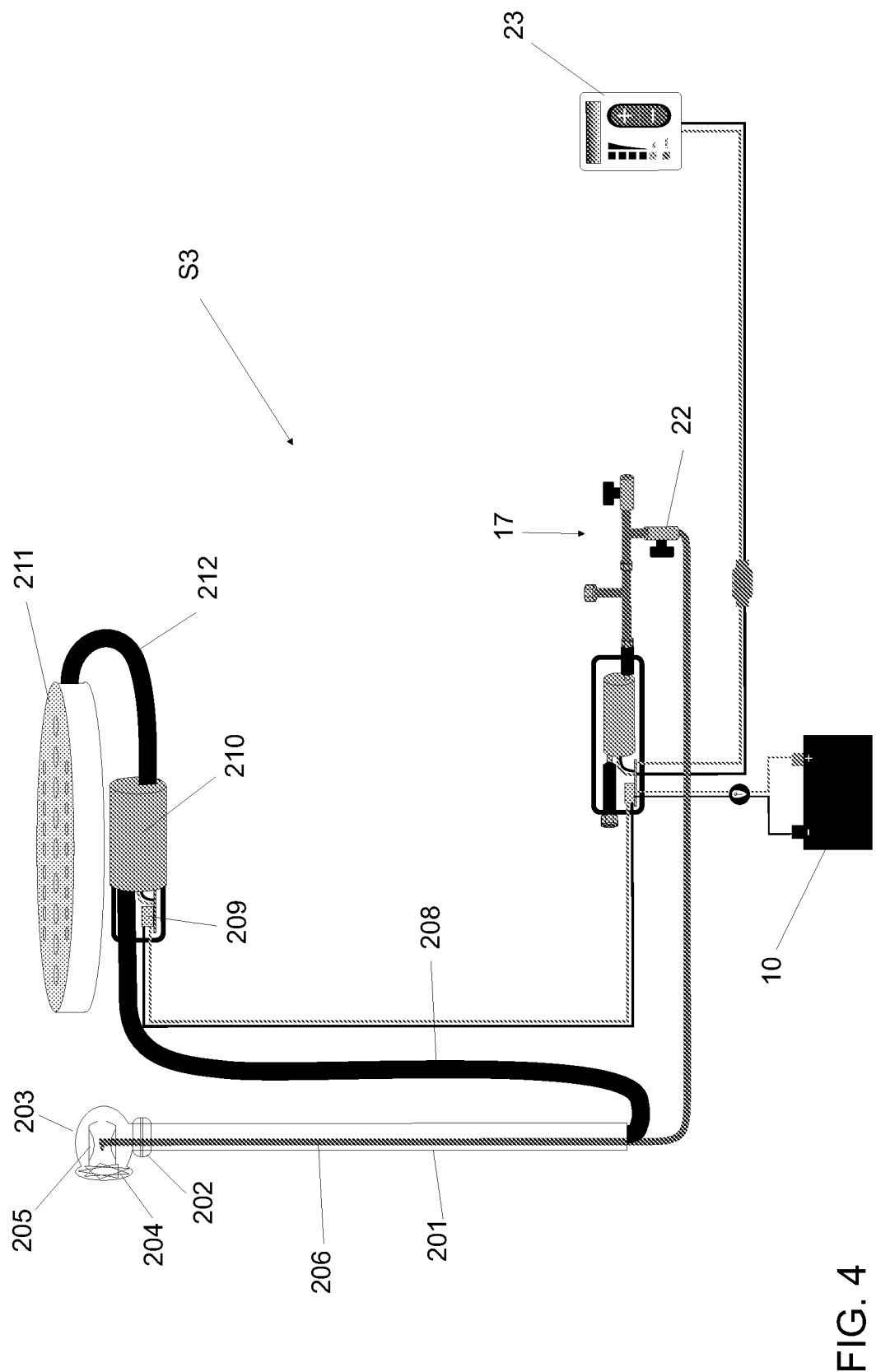
FIG. 4 is a representation of a third subsystem of cold fumigation, according to the present invention.

The third cold fumigation subsystem (S3) designed to promote the generation of cold mist, can be seen from the FIG. 4 and comprises the following components:

a cold guidance element (201) with a hollow tube shape, has at its top end, hinge means (202), which binds to a disperser head (203), inside which there is a nebulizer nozzle (204) associated with an vortex type accelerator (205) to accelerate the gaseous flux; being positioned at the throat of this vortex type accelerator (205), one end of a fluid tube (206) which extending through the interior of the cold guidance element (201), with the other end being connected to the second control valve (22) of the second pipe "T" (17); and, at the lower end (207) of this cold guidance element (201), there is connected one end of a compressed air carrying tube (208);

a microprocessor based control module (209), is electrically connected to the microprocessor based electronic module (9), and has the function of equilibrate the air quantity required according to the fluid flow rate informed by the microprocessor based electronic module (9) so that micro-droplets are generated at a constant size during the fumigation process;

an air compressor (210)—which may be of any known type, for example, a lobes compressor—which is responsible for generating pressurized air to be used to disrupt the fluid into droplets, is electrically connected to the microprocessor based control module (209) which is responsible for its functioning rate, has its air outlet connected to the carry tube (208) which is connected to the cold guidance element (201);

an air filter (211), designed to filter the ambient air, is connected to the air compressor inlet (210) through a fourth hose (212).

Figure 5:
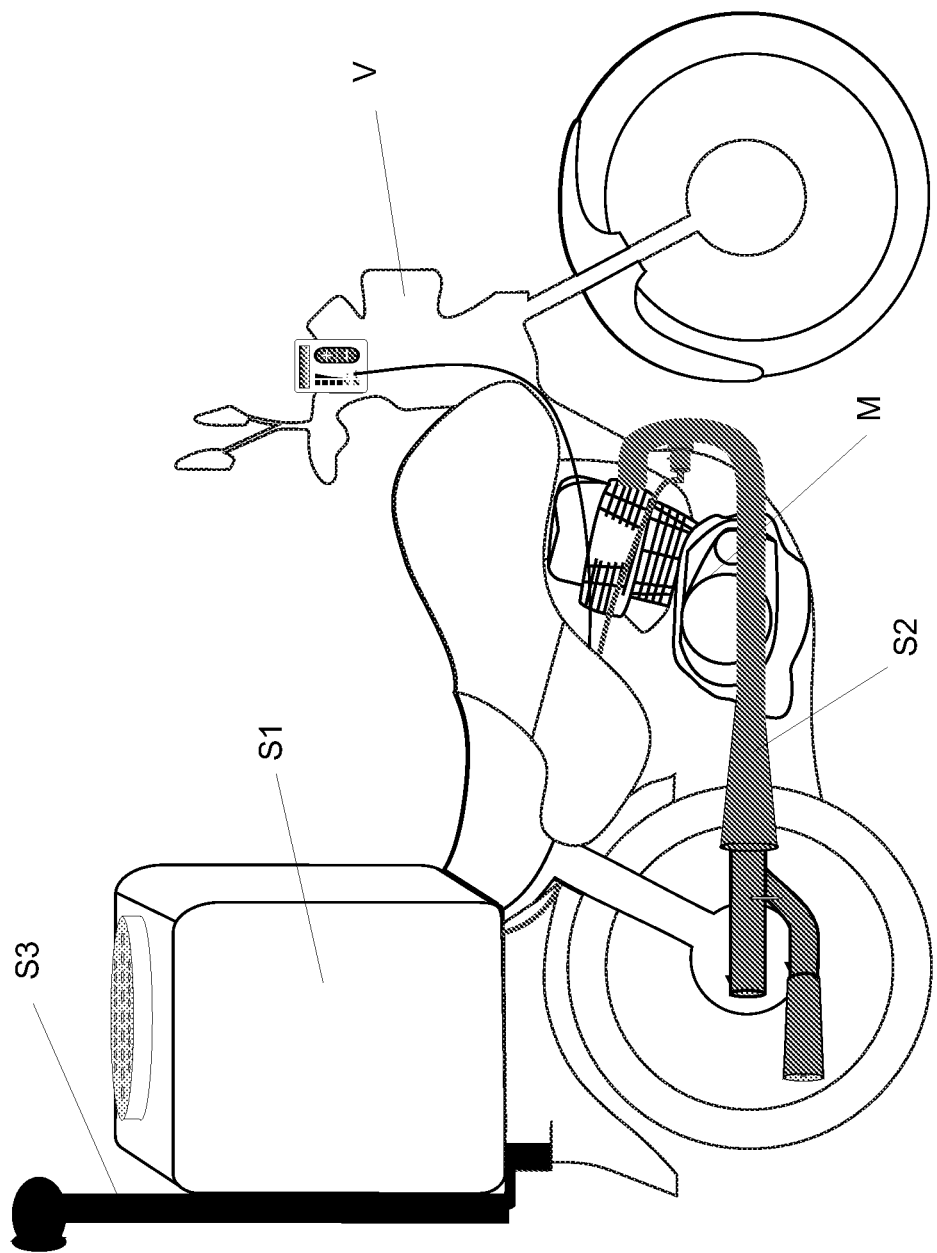
FIG. 5 is a representation of the powered fumigation system mounted on a light weight vehicle.

FIG. 5 shows a schematic representation of one possible embodiment of the system of the present invention adapted on a light weight vehicle (V).

As can be seen from the figures, the pressure valve (14a) is a always closed type valve, and when the pressure in the ducts of pesticide fluid exceeds the project value of this valve (14a), it allows the pesticide fluid to pass back to reservoir (1) avoiding the disruption of any connection between tubes and hoses, and preventing an accidental pesticide spillage in the environment.

The first control valve (21) and the second control valve (22) are manually operated by the operator, before the beginning of the service to be performed; and, depending on the service to be executed, be opened only that valve responsible for release the flux to the subsystem which will be in operation (S2, S3), remaining the other one closed.

The switching box (23) attached to the guidance device of light weight vehicle (V), allows that the whole system operation rate be determinate by the operator, without divert attention from driving the vehicle.

The hinge means (202) between the cold guidance element (201) and the disperser head (203) can be, for example, a "ball" type joint, which allows an adjustment in an angle in the vertical and in the lateral position, between the cold guidance element (201) and the disperser head (203).

The position switching position of the flow guidance element (113) so as to direct the gases from the engine (M) to the second exhaust end (116) allows that the light weight vehicle (V) can be driven through the streets when not in fumigation service.

The fluid to be used in the fumigation can be chosen from:
an oil-based pesticide, and the process is called thermo-nebulization; and
an water-based pesticide, and the process is called Ultra Low Volume "UVB" or, when the nebulization involves heat, thermo-UVB.

It is possible to conclude from what has been described so far, that the powered fumigation system object of the present invention has the following advantages:

flexibility regarding to the choice of the pesticide to be employed; where the base type (oil or water) can be determined according to the environment (city or countryside) to be fumigated, combining so the efficiency and the safety;

the possibility of performing a hot fumigation or a cold fumigation with the same vehicle with indisputable cost savings in terms of equipment;

the whole system, with both operation possibilities, being installed on a vehicle that has versatility, ease of operation and low costs of maintenance and fuel consumption;

operation versatility in either city as in countryside, still presenting to this second option, an easier traffic condition on narrow trails of farming as well as on hard uphill and downhill existing in plantations areas on the hills slopes;

accuracy in proportioning the pesticide fluid, thanks to the preprogrammed microprocessor based electronic module (9), which, together with the command selected by the switching box (23), determines the operation's functioning rate of the whole system, where:

in the case of hot mist, it is responsible for the appropriate amount of pesticide being pumped into burning, without losing the heat capacity, which leads to a concentration of smoke that can impair the efficiency, or of the unburned liquid pesticide which can be extracted out of the system, with soil contamination and compromising the safety;

on the other hand, when the operation involves cold mist, the preprogrammed microprocessor based electronic module (9) works along with the microprocessor based control module (209), so as to balance the amount of air required, according to the fluid flow rate data informed by the microprocessor based electronic module (9), so as to be produced micro-droplets on a constant size, and suitable to stay airborne for the right time for maximum efficiency;

the fact that the system work controlled by the microprocessor based modules (9, 209), with a capacity to be self-regulating for better efficiency, do not require to the vehicle driver also be specialized in the operation of the system, characteristic not occurring with others related equipment, wherein this fact has effect in the operational safety, since the driver has his attention turned just in order to drive the vehicle across the environment to be treated.

Although the present invention has been described in its preferred embodiment, the main concept of guiding the present invention, which is a powered fumigation system for promoting a fumigation intended for pest control on open environments, either agricultural or urban, by means a process of creating a hot mist or a cold mist, all of them integrated into a lightweight vehicle, remains preserved as to its innovative character, where those usually skilled in the art may envision and practice variations, modifications, changes, adaptations and reasonable and compatible equivalents to the present working scope, without however depart from the spirit and scope of the present invention, which are represented by the claims which follows.

The invention claimed is:

1. MOTORISED FUMIGATION SYSTEM for fumigation pest control in agricultural and urban open spaces, comprising:

(S1) a storage and pumping subsystem;

(S2) a hot fumigation subsystem; and (S3) a cold fumigation subsystem;

wherein the storage and pumping subsystem (S1) comprises:

a reservoir (1), for storing a fluid and adapted for mounting on a rear part of a light weight vehicle (V), the reservoir further comprising a first fluid suction duct (4);

a centrifugal pump (7), for pumping the fluid from the first fluid suction duct (4), the pump further comprising a power supply and a fluid outlet;

a preprogrammed microprocessor based electronic module (9) electrically connected to a battery (10) of the light weight vehicle and electrically connected to the power supply of the centrifugal pump (7);

a first tube "T" (12), having an inlet (13) in fluid communication with the fluid outlet of the centrifugal pump (7) and an outlet (16);

a second tube "T" (17) having an inlet (18) in fluid connection with the outlet (16), a first control valve (21), and a second control valve (22), the first control valve being adapted to permit or prevent a flow of the fluid to the hot fumigation subsystem (S2); and the second control valve (22) being adapted to permit or prevent a flow of the fluid to the cold fumigation subsystem (S3); and a switching box (23), fixed to a guidance device of the light weight vehicle (V), and electrically connected to the microprocessor based electronic module (9);

the hot fumigation subsystem (S2) comprises:

an inner tube (101) of high thermal conductivity;

a fluid flow line (109) in fluid communication with the second tube "T" via the first control valve (21);

a thermally insulating blanket (110) surrounding the inner tube (101);

an outer body (111) surrounding the thermally insulating blanket (110); and a flow guidance element (113); wherein the inner tube (101) comprises a tapered sleeve (102) adapted to collect and carry hot exhaust gases from an engine (M) of the light weight vehicle (V); a curved region (101a) connected to the tapered sleeve (102) for receiving the hot exhaust gases from the tapered sleeve (102); a combustion capsule (103) connected to the curved region (101a), the combustion capsule (103) comprising an "L" connection (108) having an inlet in fluid communication with the fluid flow line (109), a wrap closure (106) having an inlet in fluid communication with the "L" connection (108) and an outlet in fluid communication with an injection spray nozzle (104), the wrap closure (106) adapted to receive, contain, and force the fluid through the injection spray nozzle (104) into the inner tube (101) to be thermo-nebulized by the hot exhaust gases and conveyed to the flow guidance element (113);

and wherein the flow guidance element (113) is adapted to receive the thermo-nebulized fluid and hot exhaust gases from the inner tube (101) and discharge the thermo-nebulized fluid and hot exhaust gases; and the cold fumigation subsystem (S3) comprises:

an air filter (211);

an air compressor (210) adapted to receive and compress air from the air filter (211);

a second microprocessor based control module electrically connected to the air compressor (210) and the microprocessor based control module (9);

a second fluid flow line (206) in fluid communication with the second tube "T" via the second control valve (22); and a cold guidance element (201) in the form of a hollow tube and comprising hinge means (202) at an upper portion thereof, and a disperser head (203) connected to the hinge means (202), the cold guidance element (201) adapted to convey the second fluid flow line (206) and compressed air from the air compressor (210) to the disperser head (203), the disperser head (203) being adapted to nebulize fluid received from the second fluid flow line.

2. MOTORISED FUMIGATION SYSTEM, according to claim 1, wherein said reservoir (1) comprises an upper opening (2) for introducing the fluid, a lid (3) in the upper opening (2), the lid comprising the first fluid suction duct (4) structurally integrated thereinto, the first fluid suction duct further comprising a filtering element (5) at a lower end thereof; the lid further comprising a return duct (6) structurally integrated thereinto, the return duct in fluid communication with and adapted to receive fluid from a second outlet (14) of the first tube "T" (12) when a maximum value of a flow rate of the fluid and a maximum value of a pressure of the fluid exceed a preset threshold.

3. MOTORISED FUMIGATION SYSTEM, according to claim 1, wherein said preprogrammed microprocessor based electronic module (9) is adapted to regulate an amount of electrical current which is sent to said centrifugal pump (7) and increase or decrease the speed of said centrifugal pump (7) and increase or decrease a pressure of fluid flow at the fluid outlet of said centrifugal pump (7).

4. MOTORISED FUMIGATION SYSTEM, according to claim 1, wherein said first tube "T" (12) further comprises a second outlet (14) in fluid communication with a pressure valve (14*a*), the pressure valve (14*a*) adapted to fluidly communicate with and return fluid to the reservoir under pressure via a return hose (6).

5. MOTORISED FUMIGATION SYSTEM, according to claim 1, wherein the combustion capsule (103) further comprises a filter (105) disposed between the "L" connection (108) and the injection spray nozzle (104).

6. MOTORISED FUMIGATION SYSTEM, according to claim 1, wherein said thermally insulating blanket (110) further surrounds the combustion capsule (103) and is adapated to prevent heat losses of the hot exhaust gases coming from the engine (M).

7. MOTORISED FUMIGATION SYSTEM, according to claim 1, wherein said outer body (111) further comprises a first end (111*a*) adapted to support a connection between the curved region (101*a*) and the tapered sleeve (102) to an exhaust manifold of the engine (M), and a second end (111*b*) that extends beyond a length of the inner tube (101) in the form of a hollow cylinder (112).

8. MOTORISED FUMIGATION SYSTEM, according to claim 1, wherein the outer body (111) further comprises, at an exhaust end thereof, a hollow cylinder (112); and wherein said flow guidance element (113) further comprises a gas receiving end (114) attached to the hollow cylinder (112) a first exhaust end (115) adapted to discharge the thermo-nebulized fluid a second exhaust end (116) having a silencer (116*a*), and an internal bulkhead (117) adapted to direct the thermo-nebulized fluid directly to the first exhaust end (115) and to guide the hot exhaust gases from the engine (M) to the second exhaust end (116), wherein a position of the internal bulkhead (117) is controlled by an external manipulator (118).

9. MOTORISED FUMIGATION SYSTEM, according to claim 1, wherein said cold guidance element (201) conveys said compressed air from the air compressor (210) to the disperser head (203) via a compressed air carrying tube (208); and wherein the disperser head (203) further comprises a nebulizer nozzle (204) having a vortex accelerator (205) adapted to accelerate a mixture received from the second fluid flow line (206) and the compressed air carrying tube (208), to nebulize the fluid.

10. MOTORISED FUMIGATION SYSTEM, according to claim 1, wherein said second microprocessor based control module (209) is adapted to balance an air quantity required according to fluid flow data reported by the microprocessor based electronic module (9) to generate micro-droplets at a constant size during fumigation.

11. MOTORISED FUMIGATION SYSTEM, according to claim 4, wherein the pressure valve (14*a*) allows the fluid to return to the reservoir (1) when fluid pressure exceeds a design value, thereby preventing a disruption of operation or accidental spillage of fluid.

12. MOTORISED FUMIGATION SYSTEM, according to claim 1, wherein the first control valve (21) and the second control valve (22) are manually operated by the operator before fumigation to direct a flow of the fluid to one of subsystems S2 or S3.

13. MOTORISED FUMIGATION SYSTEM, according to claim 1, wherein the switching box (23) permits an operator of the vehicle (V) to operate the system without diverting the operator's attention from driving the vehicle (V).

14. MOTORISED FUMIGATION SYSTEM, according to claim 1, wherein the hinge means (202) allows an adjustment of an angle between the cold guidance element (201) and the disperser head (203).

15. MOTORISED FUMIGATION SYSTEM, according to claim 9, wherein the position of the internal bulkhead (117) is controlled to direct the hot exhaust gases from the engine (M) to the second exhaust end (116) to allow the vehicle (V) to be driven when not in fumigation service.

16. MOTORISED FUMIGATION SYSTEM, according to claim 1, wherein the fluid is selected from the group consisting of an oil based pesticide and a water based pesticide.

\* \* \* \* \*